UNITED STATES PATENT OFFICE.

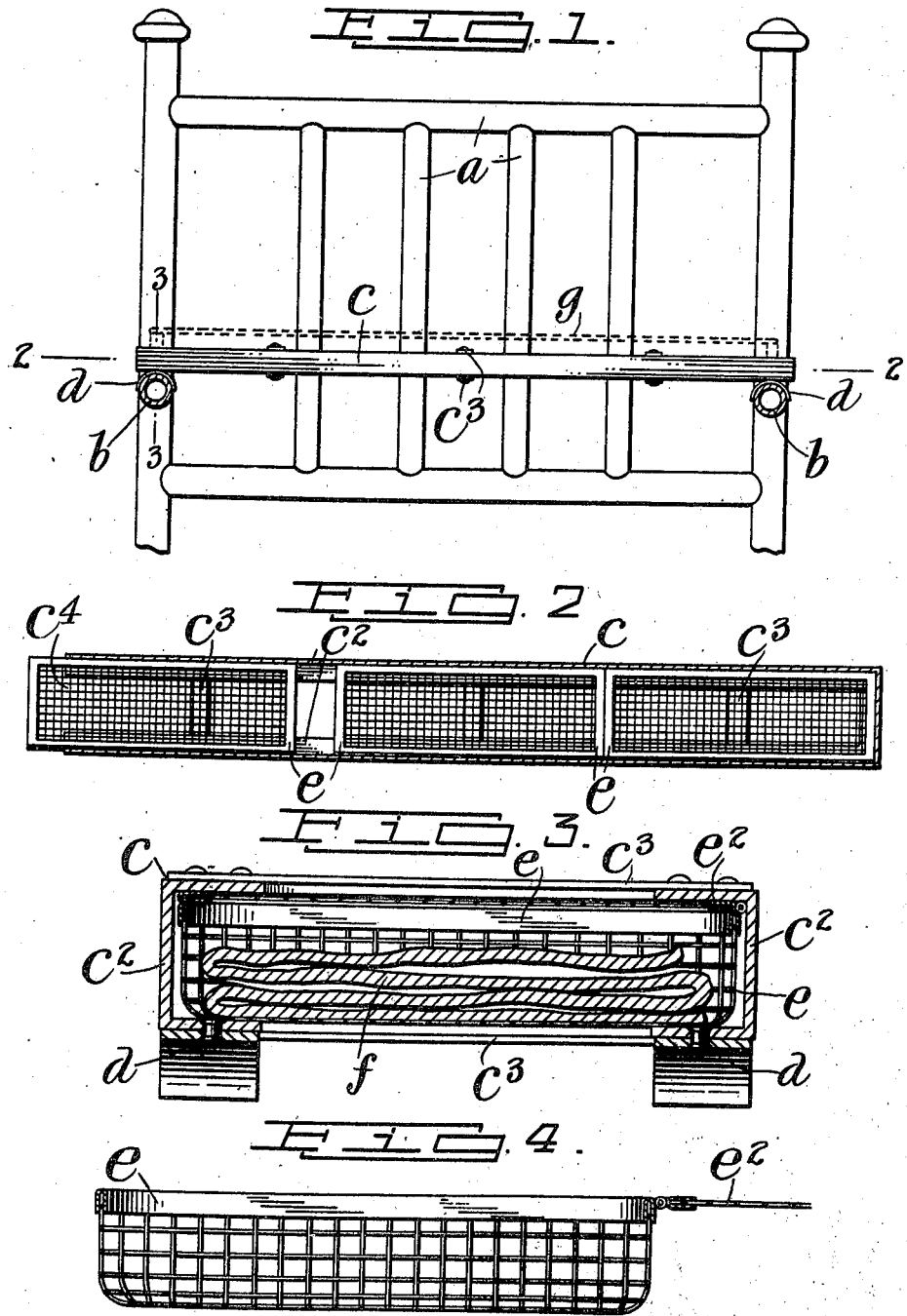

CANIO MECCO, OF BROOKLYN, NEW YORK, ASSIGNOR OF ONE-FOURTH TO BARTOLO RUGGIERO, ONE-FOURTH TO NAZZARENO COSEZNZA, AND ONE-FOURTH TO GUISEPPE DISIMONI, ALL OF BROOKLYN, NEW YORK.

BUG-TRAP FOR BEDS.

1,132,789. Specification of Letters Patent. Patented Mar. 23, 1915.

Application filed May 19, 1914. Serial No. 839,502.

*To all whom it may concern:*

Be it known that I, CANIO MECCO, a subject of the King of Italy, and residing at Brooklyn, in the county of Kings and State of New York, have invented certain new and useful Improvements in Bug-Traps for Beds, of which the following is a specification, such as will enable those skilled in the art to which it appertains to make and use the same.

This invention relates to bug traps for use in connection with beds, and the object thereof is to provide an improved device of this class which may be supported in connection with the side or end rails of a bedstead and in which bed bugs and other small vermin or insects will collect, and in which they may be destroyed, or from which they may be taken and destroyed whenever necessary or desirable.

The invention is fully disclosed in the following specification, of which the accompanying drawing forms a part, in which the separate parts of my improvement are designated by suitable reference characters in each of the views, and in which:—

Figure 1 is a transverse section of a bedstead forwardly of the foot portion thereof and looking in the direction of said foot portion; Fig. 2 a longitudinal section of my improved bug trap on the line 2—2 of Fig. 1 and on an enlarged scale; Fig. 3 a transverse section through one end portion of the bug trap and on the line 3—3 of Fig 1; and, Fig. 4 an end view of an openwork or wire basket device that forms a part of the trap.

In the drawing forming part of this specification, I have shown at $a$ a foot portion of a bedstead and at $b$ the side rails by which the foot portion is connected with the head portion of said bedstead, said head portion being not shown, and at $c$ I have shown my improved bug trap which is supported on the side rails $b$, in the construction shown.

The trap $c$ comprises a frame composed of two parallel side channel rails $c^2$ connected by transverse top and bottom bars $c^3$ secured to said rails, and secured to the bottoms of said rails are yoke-shaped clip devices $d$ which are adapted to rest on the rails $b$ of the bedstead, as clearly shown, and which support the trap in connection with the bedstead. The trap frame is open at the top and bottom and also open at the ends, or at one end as shown at $c^4$ in Fig. 2, and placed therein are a plurality of oblong rectangular open or wire work receptacles $e$, one of which is shown detached in Fig. 4.

The receptacles $e$ are basket-shaped in form and are provided at one side with a hinged cover $e^2$, and said receptacles may be inserted into the open end or ends of the trap frame and removed from said trap frame whenever desired, and, in practice, I place in the receptacles $e$ folded strips or sheets $f$ of fibrous material, thin fabric or thin paper being preferred.

The entire body portion of the receptacles $e$ are preferably composed of openwork material as are also the hinged covers $e^2$ thereof, but this construction is not absolutely necessary and said receptacles or the covers thereof may be only partly composed of openwork material.

In Fig. 1 of the drawing, I have shown at $g$ the position occupied by the bed mattress or bedspring and with the trap in the position shown, it will be between said mattress or bedspring and the side rails $b$ of the bedstead, but my invention is not limited to the placing of the trap on the side rails $b$, and said trap may be suspended between said rails or beneath said rails or in any desired manner, and is also suspended or connected with the rails of the bedstead so that it may be easily and conveniently detached whenever desired.

When the trap is in position, in or in connection with the bed, any bed bugs or other small vermin or insects with which the bed or bedstead may be infected will collect in the receptacles $e$ and in the fold of the fibrous material $f$ therein and will not collect in the joists of the bedstead or frame, and the receptacles $e$ may be removed and the said bugs or other insects destroyed by burning, drowning or in any other way, and this operation may be performed without taking the receptacles $e$ out of the trap frame or said receptacles may be taken out of said frame and inserted therein after the bugs or insects have been destroyed, and in destroying said bugs or insects the fibrous material with the bugs or insects collected therein is taken out of the receptacles $e$ and other similar material may be placed in said receptacles.

Although, I have shown and described a plurality of the receptacles e in the trap frame, my invention is not limited to this feature of the construction, and a single openwork frame may be employed and inserted into the trap frame, and it will be understood that the said trap frame may be made of any desired length, and my improved trap may be applied to bedsteads of any kind or class, or of any dimension, and various changes in and modifications of the construction herein described may be made, within the scope of the appended claims, without departing from the spirit of my invention or sacrificing its advantages.

Having fully described my invention, what I claim as new and desire to secure by Letters Patent, is:—

1. A bug trap, comprising an oblong frame open at the top and bottom and provided with end clips adapted to engage the opposite rails of a bedstead, and an oblong receptacle composed of openwork material and adapted to be inserted into said frame, said receptacle being provided with a hinged cover.

2. A bug trap, comprising an oblong frame of openwork material and provided at its ends with attaching devices adapted to be connected with the opposite rails of a bedstead, and an openwork receptacle adapted to be passed into said frame through an end thereof and provided with a hinged cover.

3. A bug trap, comprising an oblong frame of openwork material and provided at its ends with attaching devices adapted to be connected with the opposite rails of a bedstead, and an openwork receptacle adapted to be passed into said frame through an end thereof and provided with a hinged cover and containing fibrous material.

In testimony that I claim the foregoing as my invention I have signed my name in presence of the subscribing witnesses this 18th day of May 1914.

CANIO MECCO.

Witnesses:
C. MULREANY,
H. E. THOMPSON.